(12) United States Patent
Kim

(10) Patent No.: US 12,034,138 B2
(45) Date of Patent: Jul. 9, 2024

(54) BATTERY MODULE HAVING PRESSURE DEPENDENT HEAT EXCHANGE MEMBERS

(71) Applicant: LG CHEM, LTD., Seoul (KR)

(72) Inventor: Sun-Kyu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 215 days.

(21) Appl. No.: 16/770,854

(22) PCT Filed: Oct. 8, 2019

(86) PCT No.: PCT/KR2019/013228
§ 371 (c)(1),
(2) Date: Jun. 8, 2020

(87) PCT Pub. No.: WO2020/076067
PCT Pub. Date: Apr. 16, 2020

(65) Prior Publication Data
US 2020/0388892 A1 Dec. 10, 2020

(30) Foreign Application Priority Data

Oct. 12, 2018 (KR) .................. 10-2018-0122132

(51) Int. Cl.
*H01M 10/6555* (2014.01)
*H01M 10/625* (2014.01)
(Continued)

(52) U.S. Cl.
CPC ..... *H01M 10/6555* (2015.04); *H01M 10/625* (2015.04); *H01M 10/647* (2015.04);
(Continued)

(58) Field of Classification Search
CPC ................ Y02E 60/10; Y02E 60/20
See application file for complete search history.

(56) References Cited

U.S. PATENT DOCUMENTS 10,396,416 B2   8/2019  Bowersock et al.
2006/0063066 A1* 3/2006  Choi .............. H01M 10/0525
                                                429/62

(Continued)

FOREIGN PATENT DOCUMENTS

CN    1993846 A    7/2007
CN    101944578 A   1/2011
(Continued)

OTHER PUBLICATIONS

Bai et al., "Thermal management performances of PCM/water cooling-plate using for lithium-ion battery module based on non-uniform internal heat source", Applied Thermal Engineering 126 (2017) 17-27; http://dx.doi.org/10.1016/j.applthermaleng.2017.07.141 (Year: 2017).*

(Continued)

*Primary Examiner* — Ula C Ruddock
*Assistant Examiner* — Anna Korovina
(74) *Attorney, Agent, or Firm* — Birch, Stewart, Kolasch & Birch, LLP

(57) ABSTRACT

A battery module improves performance of secondary batteries through effective thermal control. The battery module includes at least one secondary battery, a module case having an empty space formed therein to accommodate the at least one secondary battery in the inner space and at least one heat pressure exchange member disposed to face the secondary battery in the inner space of the module case. The at least one heat pressure exchange member is configured to absorb and retain heat when a pressure applied from the secondary battery is equal to or less than a reference value and release the retained heat when the pressure applied from the secondary battery is higher than the reference value.

4 Claims, 15 Drawing Sheets

(51) Int. Cl.
  *H01M 10/647* (2014.01)
  *H01M 10/653* (2014.01)
  *H01M 10/659* (2014.01)
  *H01M 50/211* (2021.01)
  *H01M 50/291* (2021.01)
  *H01M 50/293* (2021.01)

(52) U.S. Cl.
  CPC ....... *H01M 10/653* (2015.04); *H01M 10/659* (2015.04); *H01M 50/211* (2021.01); *H01M 50/291* (2021.01); *H01M 50/293* (2021.01); *H01M 2220/20* (2013.01)

(56) References Cited

U.S. PATENT DOCUMENTS

| | | | | |
|---|---|---|---|---|
| 2007/0292751 | A1* | 12/2007 | Cherng | H01M 10/659 429/185 |
| 2011/0151301 | A1* | 6/2011 | Kim | H01M 10/613 429/120 |
| 2012/0161069 | A1* | 6/2012 | Nagai | C01G 53/50 252/182.1 |
| 2012/0171623 | A1 | 7/2012 | Yang et al. | |
| 2012/0263984 | A1 | 10/2012 | Krammer | |
| 2012/0282506 | A1* | 11/2012 | Hohenthanner | H01M 10/6557 165/185 |
| 2013/0216884 | A1 | 8/2013 | Takasaki et al. | |
| 2013/0309545 | A1 | 11/2013 | Daubitzer et al. | |
| 2014/0004394 | A1* | 1/2014 | Kerkamm | H01M 10/615 429/50 |
| 2014/0308556 | A1* | 10/2014 | Obata | H01M 10/0481 429/94 |
| 2015/0357616 | A1 | 12/2015 | Morisaku et al. | |
| 2016/0237731 | A1 | 8/2016 | Mair et al. | |
| 2016/0254504 | A1 | 9/2016 | Kim et al. | |
| 2017/0214103 | A1 | 7/2017 | Onnerud et al. | |
| 2017/0263988 | A1 | 9/2017 | Rasp | |
| 2017/0350659 | A1 | 12/2017 | Honda et al. | |
| 2020/0300558 | A1 | 9/2020 | Chopard et al. | |

FOREIGN PATENT DOCUMENTS

| | | |
|---|---|---|
| CN | 203351708 U | 12/2013 |
| CN | 104716402 A | 6/2015 |
| CN | 105552479 A | 5/2016 |
| DE | 102013225582 A1 * | 6/2015 ......... B60H 1/00278 |
| FR | 3015780 A3 * | 6/2015 .......... B60L 11/1875 |
| JP | 2008-258110 A | 10/2008 |
| JP | 2011-249016 A | 12/2011 |
| JP | 2013-20826 A | 1/2013 |
| JP | 2013-038001 A | 2/2013 |
| JP | 2014-146417 A | 8/2014 |
| JP | 2015-125881 A | 7/2015 |
| JP | 2017-126418 A | 7/2017 |
| JP | 2017-523584 A | 8/2017 |
| JP | 2017-218971 A | 12/2017 |
| JP | 2018-003616 A | 1/2018 |
| JP | 2018-503217 A | 2/2018 |
| JP | 6344245 B2 | 6/2018 |
| KR | 10-2011-0070199 A | 6/2011 |
| KR | 10-2013-0044309 A | 5/2013 |
| KR | 10-2015-0050449 A | 5/2015 |
| KR | 10-2015-0114862 A | 10/2015 |
| KR | 10-2017-0005117 A | 1/2017 |
| WO | WO-2011146919 A2 * | 11/2011 .......... H01M 10/613 |
| WO | WO 2015-050269 A1 | 4/2015 |
| WO | WO 2017/153692 A1 | 9/2017 |

OTHER PUBLICATIONS

Lallich et al., FR-3015780 machine translation (Year: 2015).*
Tokoro et al., "External stimulation-controllable heat-storage ceramics", Nature Communications, 6:7037, 2015; DOI: 10.1038/ncomms8037 (Year: 2015).*
Hald et al., DE-102013225582 Machine Translation (Year: 2015).*
International Search Report (PCT/ISA/210) issued in PCT/KR2019/013228, dated Jan. 22, 2020.
Extended European Search Report for European Application No. 19870658.2. dated Mar. 4, 2021.
Shi et al., "Non-steady experimental investigation on an integrated thermal management system for power battery with phase change materials", Energy Conversion and Management, vol. 136, Feb. 10, 2017, pp. 84-86.
Fanfei Bai et al., "Thermal management performances of PCM/water cooling-plate using for lithium-ion battery module based on nonuniform internal heat source," Applied Thermal Engineering, 126 (2017), pp. 17-27.
Indian Office Action for Indian Application No. 202017033716, dated Aug. 31, 2022, with an English translation.

* cited by examiner

US 12,034,138 B2

BATTERY MODULE HAVING PRESSURE DEPENDENT HEAT EXCHANGE MEMBERS

TECHNICAL FIELD

The present application claims priority to Korean Patent Application No. 10-2018-0122132 filed on Oct. 12, 2018 in the Republic of Korea, the disclosures of which are incorporated herein by reference.

The present disclosure relates to a battery including a secondary battery, and more particularly, to a battery module improved in charging performance and/or thermal control performance, and a battery pack and a vehicle including the battery module.

BACKGROUND ART

Currently commercialized secondary batteries include nickel cadmium battery, nickel hydrogen battery, nickel zinc battery, lithium secondary battery, and so on. Among these, the lithium secondary battery has almost no memory effect to ensure free charge and discharge, compared to the nickel-based secondary battery, and the lithium secondary battery is spotlighted due to a very low discharge rate and a high energy density.

The lithium secondary battery mainly uses a lithium-based oxides and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior, or a battery case, for hermetically accommodating the electrode assembly together with an electrolyte.

Generally, the lithium secondary batteries may be classified into a can-type secondary battery having an electrode assembly included in a metal can and a pouch-type secondary battery having an electrode assembly included in a pouch of an aluminum laminate sheet, depending on the shape of the exterior.

Typically, the performance of the secondary battery may be degraded when the secondary battery is used in a temperature environment that is higher or lower than an appropriate temperature. For example, if the secondary battery is charged at a temperature lower than the proper temperature, the charging performance may be degraded. Moreover, recently, the demand for rapid charging has increased in order to shorten the time required for charging the battery. At this time, if the ambient temperature is lower than the proper temperature, the rapid charging performance may not be properly expressed.

In addition, the secondary battery may generate more heat during a discharging process rather than during a charging process. In the discharge process, if the heat is not properly removed from the secondary battery, due to the temperature higher than the appropriate temperature, not only the performance of the secondary battery is degraded, but also in severe cases the ignition or explosion occurs at the battery. Moreover, recently, the secondary batteries are widely used for driving and energy storage not only for small-sized devices such as portable electronic devices but also for medium-sized and large-sized devices such as a vehicle and an energy storage system (ESS). In this case, in order to increase the capacity and output of the battery module, the battery module includes a large number of secondary batteries electrically connected to each other. Here, the plurality of secondary batteries may be accommodated in one module case to constitute one battery module. In this situation, due to the heat generated from the plurality of secondary batteries, it is more important to cool the battery module. Moreover, in the case of a medium-sized or large-sized battery module, thermal imbalance may occur between secondary batteries according to locations in one module. Further, even in one secondary battery, thermal imbalance may occur depending on regions. If thermal imbalance occurs between several secondary batteries or between various regions of one secondary battery, the performance or safety of the battery module, the battery pack or the secondary battery may be degraded.

DISCLOSURE

Technical Problem

The present disclosure is designed to solve the problems of the related art, and therefore the present disclosure is directed to providing a battery module, which may improve the performance of secondary batteries through effective thermal control, and a battery pack and a vehicle including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module having at least one secondary battery, a module case having an inner space formed therein to accommodate the at least one secondary battery in the inner space; and at least one heat pressure exchange member disposed to face the secondary battery in the inner space of the module case and configured to absorb and retain heat when a pressure applied from the secondary battery is equal to or less than a reference value and release the retained heat when the pressure applied from the secondary battery is higher than the reference value.

Here, the secondary battery may be provided in plural and the at least one heat pressure exchange member is provided in plural, and one of the heat pressure exchange members may be interposed in a space between each of the secondary batteries.

In addition, the secondary batteries may be pouch-type secondary batteries arranged in a horizontal direction to stand up in the inner space of the module case, and the heat pressure exchange members may be provided in a plate shape and disposed to stand up in the space between each of the secondary batteries.

In addition, the at least one heat pressure exchange member may include a ceramic material that absorbs and retains heat when a pressure is not applied and releases the retained heat when a pressure is applied.

In addition, the heat pressure exchange member may include a heat exchange unit made of a material that absorbs or releases heat depending on whether a pressure is applied; and a body unit made of a material different from the heat exchange unit and configured to support the heat exchange unit.

In addition, the body unit may have a standing plate shape.

In addition, the heat exchange unit may have a standing plate shape, and a lower end of the heat exchange unit may be coupled to an upper end of the body unit.

In addition, the body unit may be located at an outer circumference of the heat exchange unit and configured to surround the heat exchange unit.

In addition, the heat exchange unit may be coated on at least a portion of a surface of the body unit.

In addition, the heat exchange unit may protrude further toward the secondary battery than the body unit.

In addition, the heat exchange unit may have portions with different thicknesses in one heat pressure exchange member.

In addition, at least a portion of the heat exchange unit may have a thickness gradually decreasing from a center portion of the heat pressure exchange member to an edge portion thereof.

In another aspect of the present disclosure, there is also provided a battery pack, comprising the battery module according to the present disclosure.

In another aspect of the present disclosure, there is also provided a vehicle, comprising the battery module according to the present disclosure.

Advantageous Effects

According to an embodiment of the present disclosure, thermal control may be effectively performed at a battery module including at least one secondary battery.

In particular, the secondary battery may change in volume during charging and discharging, and in the present disclosure, it is possible to absorb heat from the secondary battery or release heat to the secondary battery by using the volume change of the secondary battery.

Thus, according to this embodiment of the present disclosure, the performance of the secondary battery may be improved. In particular, during rapid charging of the secondary battery, since heat is supplied to the secondary battery, the charging performance may be improved further. In addition, although the charging performance of the secondary battery may be degraded in a low temperature situation such as winter, if the present disclosure is applied, the charging performance of the secondary battery may be secured to a certain level even in a low temperature situation.

Moreover, according to this embodiment of the present disclosure, even if no separate energy is supplied, since heat is absorbed, retained and released by itself, there is no need for a separate configuration for thermal control, and associated costs may also be reduced.

In addition, according to an embodiment of the present disclosure, when a plurality of secondary batteries are included in the battery module, thermal imbalance between the secondary batteries may be reduced or eliminated.

In addition, according to an embodiment of the present disclosure, it is possible to reduce the occurrence of thermal imbalance for different regions of one secondary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
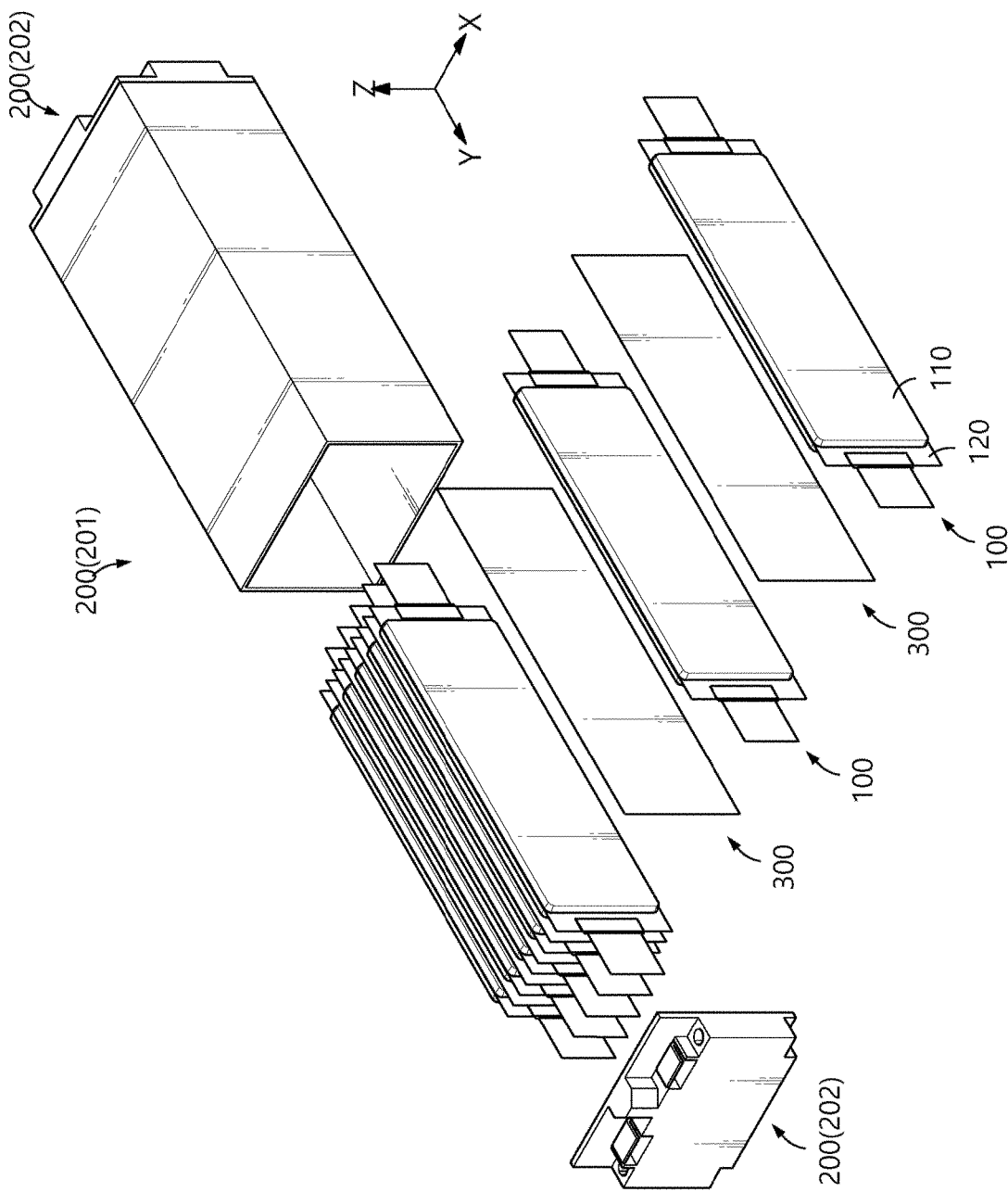
FIG. 1 is an exploded perspective view schematically showing a battery module according to an embodiment of the present disclosure.
Figure 2:
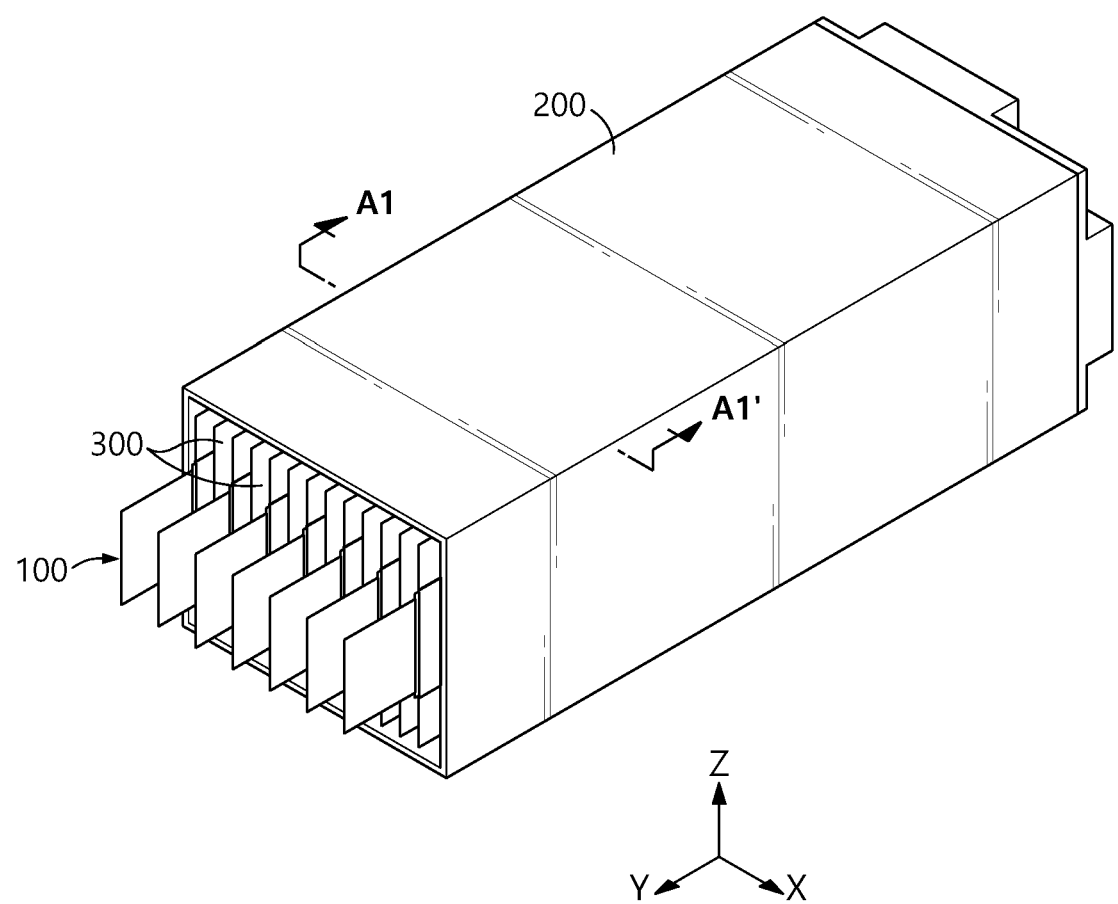
FIG. 2 is a perspective view schematically showing some components of FIG. 1 in an assembled state.
Figure 3:
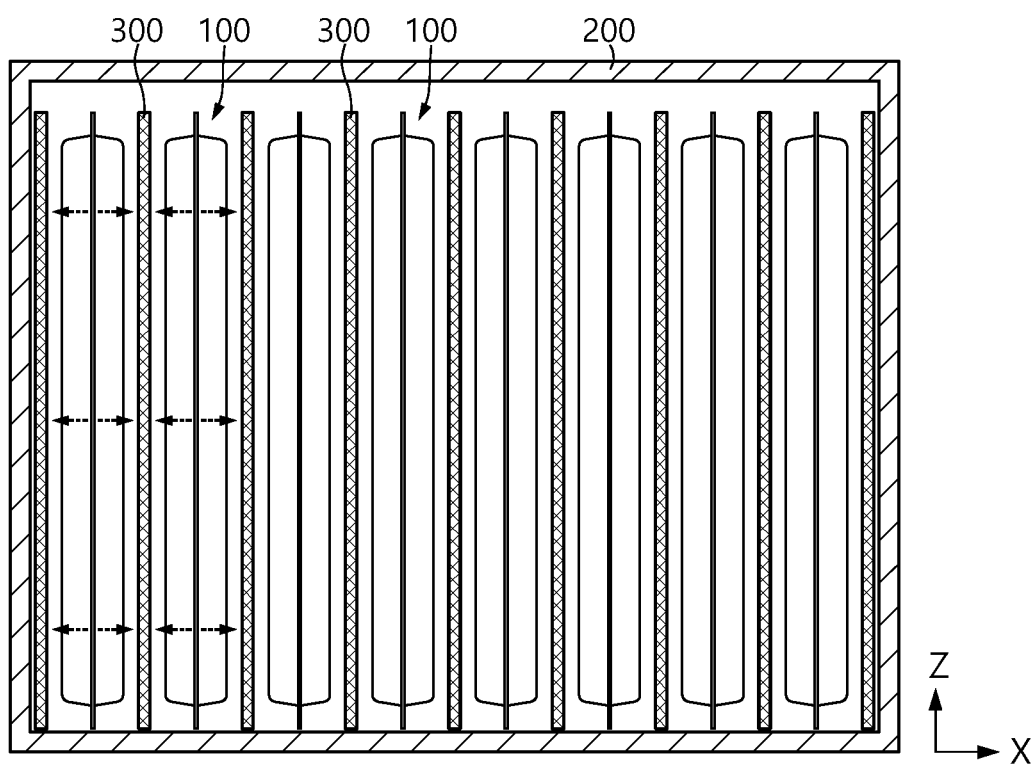
FIG. 3 is a front view schematically showing the battery module according to an embodiment of the present disclosure.

FIG. 1 is an exploded perspective view schematically showing a battery module according to an embodiment of the present disclosure, and FIG. 2 is a perspective view schematically showing some components of FIG. 1 in an assembled state. Also, FIG. 3 is a front sectioned view schematically showing the battery module according to an embodiment of the present disclosure. For example, FIG. 3 may be regarded as a diagram schematically showing a section, taken along the line A1-A1' of FIG. 2.

Referring to FIGS. 1 to 3, the battery module according to the present disclosure may include a secondary battery 100, a module case 200 and a heat pressure exchange member 300.

The secondary battery 100 is a component capable of repeatedly charging and discharging to retain and release electrical energy and may include an electrode assembly, an electrolyte and an exterior. Here, the electrode assembly is as an assembly of an electrode and a separator and may be configured such that at least one positive electrode plate and at least one negative electrode plate are disposed with the separator being interposed therebetween. In addition, each electrode plate of the electrode assembly has an electrode tab that may be connected to an electrode lead. In particular, in the case of a pouch-type secondary battery, at least one electrode tab may be connected to the electrode lead, and the electrode lead may be interposed between the pouch exteriors and exposed to the outside to function as an electrode terminal. The exterior has an empty space formed therein to accommodate the electrode assembly and the electrolyte and may be configured in a sealed form. The exterior is made of a metallic material in the case of a can-type secondary battery and may be configured to have an outer insulating layer, a metal layer and an inner adhesive layer in the case of a pouch-type secondary battery. The configuration of the secondary battery is obvious to those skilled in the art and thus will not be described in detail here. In addition, various kinds of secondary batteries known at the time of filing of this application may be employed as in the battery module according to the present disclosure.

At least one secondary battery 100 may be included in the battery module. In particular, in order to increase the output and/or capacity of the battery module, the battery module may include a plurality of secondary batteries 100. In addition, the plurality of secondary batteries 100 may be electrically connected in series and/or in parallel with each other.

The module case 200 has an empty space formed therein and may accommodate at least one secondary battery 100 in the empty space, namely an inner space. The module case 200 may be configured to have at least one open side such that some components (a body 201) thereof may accommodate the secondary battery 100. For example, the body 201 of the module case 200 may be formed in a substantially rectangular tubular shape and may be configured be opened at a front side and/or a rear side thereof. In addition, the module case 200 may further include a cover 202 coupled to the open portion of the body 201 to seal the inner space of the module case 200.

Meanwhile, the module case 200 may be made of various materials such as plastic or metal. However, the present disclosure is not limited to the specific material or shape of the module case 200, and various kinds of module cases 200 known at the time of filing of this application may be employed in the present disclosure.

At least one heat pressure exchange member 300 may be included and disposed in the inner space of the module case 200 to face the secondary battery 100. That is, the heat pressure exchange member 300 may be disposed such that at least one surface thereof faces a surface of the secondary battery 100. For example, the heat pressure exchange member 300 may be configured in the form of a plate or a sheet with two wide surfaces. In addition, the secondary battery 100, particularly the pouch-type secondary battery, may have a substantially plate-like or cuboid shape. In this case, the heat pressure exchange member 300 may be arranged in parallel to the secondary battery 100 so that one or two surfaces of the heat pressure exchange member 300 face the wide surface of the secondary battery 100 (the surfaces of the accommodation portion) located at one side or both sides.

The heat pressure exchange member 300 may absorb or release heat depending on whether a pressure is applied by the secondary battery 100 or according to the degree of pressure applied. This will be described below in more detail with reference to FIG. 4 along with FIG. 3.

Figure 4:
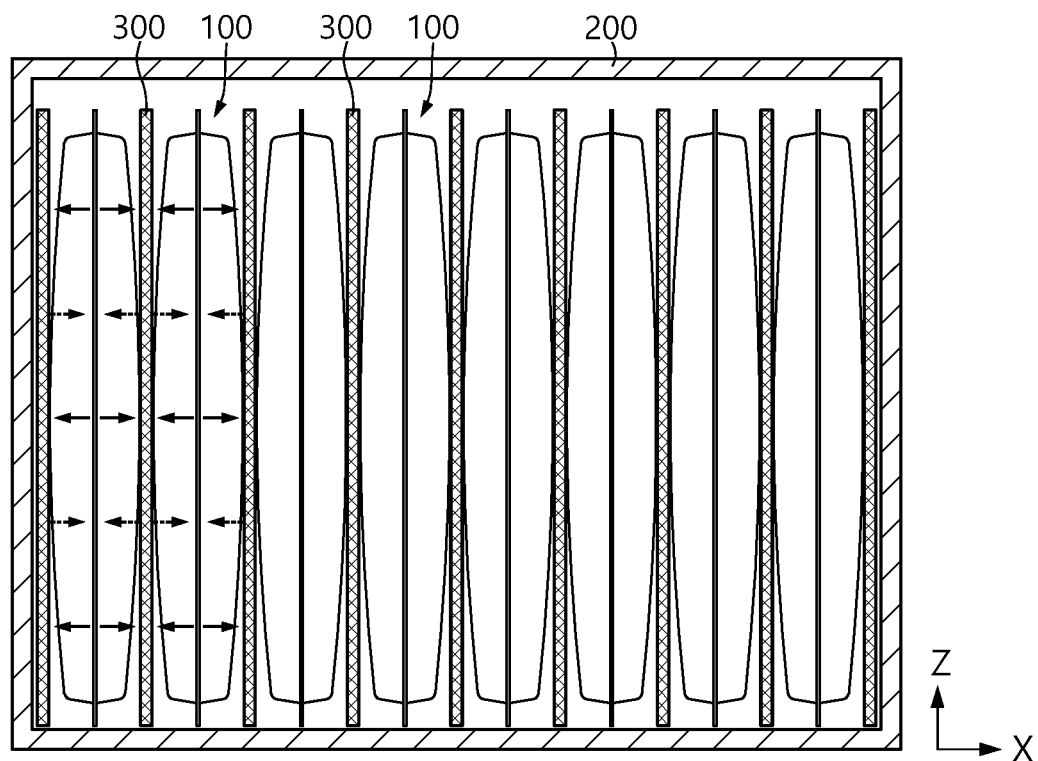
FIG. 4 is a diagram schematically showing that a heat pressure exchange member releases heat or absorbs heat depending on whether a pressure is applied by a secondary battery.

FIG. 4 is a diagram schematically showing that the heat pressure exchange member 300 releases or absorbs heat depending on whether a pressure is applied by the secondary battery. However, in FIGS. 3 and 4, the moving direction of heat and the expanding direction of the secondary battery indicated by arrows are shown only for some objects for the sake of simplicity.

First, if the pressure applied from the secondary battery 100 is less than or equal to a reference value, the heat pressure exchange member 300 may be configured to absorb and retain the surrounding heat. For example, as shown in FIG. 3, if a pressure is not applied from the secondary battery 100 to the heat pressure exchange member 300, the heat generated at the secondary battery 100 may be transferred to the heat pressure exchange member 300 and absorbed (a dotted arrow). In addition, the heat absorbed in this way may be retained inside the heat pressure exchange member 300.

Next, if the pressure applied from the secondary battery 100 is greater than the reference value, the heat pressure exchange member 300 may be configured to release the retained heat to the surroundings. For example, as shown in FIG. 4, if a pressure is applied from the secondary battery 100 to the heat pressure exchange member 300 (a solid arrow), the heat retained inside the heat pressure exchange member 300 may be supplied to the secondary battery 100 (a dotted arrow).

The heat pressure exchange member 300 may be configured to absorb or release heat depending on whether the applied pressure is greater than the reference value. Here, the reference value may be variously designed in advance according to the type of material of the heat pressure exchange member 300, the shape of the heat pressure exchange member 300, the distance between the heat pressure exchange member 300 and the secondary battery 100, or the like. For example, the reference value may be 0 (zero). In this case, the heat pressure exchange member 300 may absorb and retain the surrounding heat when a pressure is not applied from the secondary battery 100, and may release heat to the surroundings when a pressure is applied from the secondary battery 100. Alternatively, the reference value may be set to a value higher than 0 (zero), such as 10 MPa. In this case, the heat pressure exchange member 300 may absorb and retain the surrounding heat when the pressure applied from the secondary battery 100 is 10 MPa or less, and may release the retained heat to the surroundings when the pressure applied from the secondary battery 100 is greater than 10 MPa.

Further, the heat pressure exchange member 300 may be configured such that at least one surface thereof faces the surface of the secondary battery 100. Thus, in a state where no pressure is applied from the secondary battery 100 or only a pressure less than the reference value is applied, the heat pressure exchange member 300 may cool the secondary battery 100 by absorbing the heat from the secondary battery 100. In addition, after that, if a pressure is applied from the secondary battery 100 or a pressure greater than the reference value is applied, the heat pressure exchange member 300 may heat the secondary battery 100 by supplying the heat to the secondary battery 100.

In particular, in the present disclosure, the heat pressure exchange member 300 may be configured to absorb or release heat depending on the state of charge and discharge of the secondary battery 100. The secondary battery 100 may expand in volume during charging and may decrease in volume during discharge. For example, the configuration shown in FIG. 3 may represent a diagram showing a situation when the secondary battery 100 is discharged, and the configuration shown in FIG. 4 may represent a diagram showing a situation when the secondary battery 100 is charged.

In consideration of the above properties of the secondary battery 100, the battery module of the present disclosure may be configured such that a pressure is not applied from the secondary battery 100 to the heat pressure exchange member 300 when the secondary battery 100 is discharged and a pressure is applied from the secondary battery 100 to the heat pressure exchange member 300 when the secondary battery 100 is charged. For example, the battery module according to an embodiment of the present disclosure may be configured such that the secondary battery 100 and the heat pressure exchange member 300 are spaced by a predetermined distance without contacting each other when the secondary battery 100 is discharged. In addition, the battery module according to this embodiment of the present disclosure may be configured such that the secondary battery 100 and the heat pressure exchange member 300 come into close contact with each other when the secondary battery 100 is charged so that a pressure caused by the expansion of the secondary battery 100 is applied to the heat pressure exchange member 300.

Alternatively, the battery module of the present disclosure may be configured such that a pressure less than the reference value is applied from the secondary battery 100 to the heat pressure exchange member 300 when the secondary battery 100 is discharged and a pressure greater than the reference value is applied from the secondary battery 100 to the heat pressure exchange member 300 when the secondary battery 100 is charged. For example, the battery module according to an embodiment of the present disclosure may be configured such that the secondary battery 100 and the heat pressure exchange member 300 come into contact with each other even when the secondary battery 100 is discharged, but a pressure is less than the preset reference value is applied from the secondary battery 100 to the heat pressure exchange member 300. Here, the reference value may be referred to as a minimum value of the temperature at which the heat pressure exchange member 300 releases heat. In addition, the battery module according to this embodiment may be configured such that the pressure applied to the heat pressure exchange member 300 is greater than the reference value as the secondary battery 100 is expanded when the secondary battery 100 is charged.

In this configuration, the configuration where the pressure applied from the secondary battery 100 to the heat pressure exchange member 300 is equal to or less than the reference value when the secondary battery 100 is discharged and the pressure applied from the secondary battery 100 to the heat pressure exchange member 300 is greater than the reference value when the secondary battery 100 is charged may be implemented by appropriately designing or selecting the type and shape of the secondary battery 100, the material and shape of the heat pressure exchange member 300, and the like.

In the above embodiment of the present disclosure, the heat pressure exchange member 300 may absorb and retain the heat generated at the secondary battery 100 when the secondary battery 100 is discharged. In addition, the heat pressure exchange member 300 may supply the retained heat to the secondary battery 100 when the secondary battery 100 is charged.

In particular, in the case of a lithium secondary battery 100, the reaction made therein during the charging process may be an endothermic reaction, and the reaction made therein during the discharging process may be an exothermic reaction. In addition, as mentioned above, the lithium secondary battery 100 may expand in volume when charged and may decrease in volume when discharged. Thus, according to an embodiment of the present disclosure, when the secondary battery 100 is being charged, the lithium secondary battery 100 may expand in volume to press the heat pressure exchange member 300 (the solid arrow in FIG. 4). In addition, due to this pressing, the heat pressure exchange member 300 may supply the retained heat to the secondary battery 100 (the dotted arrow in FIG. 4). If so, the secondary battery 100 receiving the heat may further activate the charging process that is an endothermic reaction, thereby further improving the charging performance. In particular, in view of these effects, the present disclosure may be regarded as being more advantageously applied to rapid charging of the battery module.

In addition, when the secondary battery 100 is being discharged, the secondary battery 100 may decrease in volume to release the pressure applied to the heat pressure exchange member 300 or lower the pressure below the reference value. Thus, the heat pressure exchange member 300 may be converted into a state capable of absorbing heat. Here, since the secondary battery 100 may make an exothermic reaction during the discharging process, the heat generated inside the secondary battery 100 may be transferred to and absorbed by the heat pressure exchange member 300 (the dotted arrow in FIG. 3). By doing so, the discharging performance of the secondary battery 100 may be further improved.

Moreover, the heat generated from not only the secondary battery 100 but also various other components existing inside or outside the battery module may be present inside the battery module. For example, heat may be generated at a battery management system (BMS), a bus bar and various integrated circuit (IC) chips located inside or outside the battery module. Alternatively, if the outside temperature is high such as in summer, the temperature inside the battery module may increase due to the heat supplied from the atmosphere or geothermal heat, and the like. In particular, if the battery module is mounted to a vehicle, the temperature inside the battery module may increase due to heat supplied from other components inside the vehicle such as a motor or an engine, heat of a car body caused by sunlight, heat of a road, and the like. In addition, if the temperature inside the battery module increases higher than an appropriate level as above, the performance of the secondary battery 100 may be degraded, and in severe cases, ignition or the like may occur at the secondary battery 100. However, in the case of the battery module according to the present disclosure, if a pressure is not applied to the heat pressure exchange member 300 or if only a pressure below a certain level is applied, the heat pressure exchange member 300 may lower the temperature inside the battery module by absorbing the heat inside the battery module. Thus, according to this embodiment of the present disclosure, the performance of the secondary battery 100 may be more stably ensured, and the safety of the battery module may be improved.

In particular, it is often desirable for the battery module to absorb heat during discharging rather than during charging. Typically, in the case of a battery mounted to a vehicle such as an electric vehicle, the vehicle is often running on a road during discharging. At this time, the temperature inside the battery module is likely to increase due to the heat generated by the secondary battery 100, the heat generated by a motor or other electronic equipment provided in the vehicle, the ambient temperature, the geothermal heat, and the like. According to an embodiment of the present disclosure, since the heat pressure exchange member 300 absorbs the heat inside the battery module when the battery module is discharged, the performance and cooling efficiency of the battery module may be further improved. Meanwhile, when charged, the vehicle is often in a state where the running is terminated. In this case, since the source for supplying heat into the battery module is reduced, the heat pressure exchange member 300 may dissipate heat so that the heat is supplied to the secondary battery 100, unlike the case of discharging. Thus, in this case, the charging performance of the secondary battery 100 may be further improved.

The heat pressure exchange member 300 may have a material that absorbs and retains heat when a pressure is not applied and releases the retained heat when a pressure is applied. In particular, the heat pressure exchange member 300 may have a ceramic material having the above characteristics.

Representatively, the heat pressure exchange member 300 may have trititanium-pentoxide ($Ti_3O_5$) as a heat storage material that absorbs, retains and releases heat according to pressure. In particular, the heat pressure exchange member 300 may have lambda trititanium-pentoxide (k-$Ti_3O_5$) as the heat storage material. The lambda trititanium-pentoxide may absorb and release about 230 kJ/L of thermal energy. In particular, lambda trititanium-pentoxide may release a thermal energy while performing phase transition to beta-trititanium-pentoxide ($\beta$-$Ti_3O_5$) when receiving a pressure of about 60 MPa. In addition, if the pressure is released to a certain level or below, the beta-trititanium-pentoxide may absorb the thermal energy while performing phase transition to lambda trititanium-pentoxide again, thereby retaining the thermal energy that may be released later at phase transition.

At least one heat pressure exchange member 300 may be included in the battery module. In particular, a plurality of heat pressure exchange members 300 may be included in the module case 200 as shown in FIGS. 1 to 4.

Preferably, the heat pressure exchange member 300 may be interposed between the secondary batteries 100. That is, a plurality of secondary batteries 100 may be included in the battery module. In this case, the heat pressure exchange member 300 may be interposed in the space between the secondary batteries 100.

For example, as shown in FIGS. 1 to 4, if the plurality of secondary batteries 100 are arranged to be stacked in a horizontal direction (an x-axis direction in the drawing), the heat pressure exchange member 300 may be disposed between the secondary batteries 100. In particular, if three or more secondary batteries 100 are arranged in a stacked form, two or more heat pressure exchange members 300 may be included such that the heat pressure exchange member 300 is interposed between every two secondary batteries 100. For example, if three or more secondary batteries 100 are stacked in one direction, one heat pressure exchange member 300 may be interposed between every two secondary batteries 100.

If the heat pressure exchange member 300 is interposed in the space between the secondary batteries 100 as described above, a pressure may be applied to the heat pressure exchange member 300 from the secondary batteries 100 positioned at both sides thereof. Thus, the pressure application and release caused by volume expansion and reduction of the secondary battery 100 may be more clearly transmitted to the heat pressure exchange member 300. Thus, the heat pressure exchange member 300 may surely release and absorb heat while the secondary battery 100 is charged and discharged. Therefore, according to this embodiment of the present disclosure, the charging performance and/or the cooling performance of the battery module by the heat pressure exchange member 300 may be more effectively improved.

Meanwhile, as shown in the figures, the secondary battery 100 is preferably a pouch-type secondary battery. The pouch-type secondary battery may be regarded as changing its volume more greatly during charging and discharging, compared to a can-type secondary battery. Thus, the heat pressure exchange member 300 may more effectively absorb and release heat depending on the secondary battery 100 is pressed.

In particular, the secondary batteries 100 may be arranged in the horizontal direction to stand up in the inner space of the module case 200. For example, as shown in FIGS. 1 to 4, in the battery module according to the present disclosure, a plurality of pouch-type secondary batteries may be arranged in the horizontal direction to stand up in an upper and lower direction (a z-axis direction in the drawing), respectively. Here, the upper and lower direction may refer to a direction perpendicular to the bottom surface of the module case 200 or the ground surface when the module case 200 of the battery module is placed on the ground surface. Meanwhile, in the present specification, the horizontal direction may be referred to as a direction parallel to the bottom surface of the module case 200 or the ground surface.

In a state where the pouch-type secondary batteries stand up as above, wide outer surfaces of the accommodation portion 110 may be provided in the left and right direction (an x-axis direction in the drawing), respectively, and sealing portions 120 may be located at upper, lower, front and rear sides thereof. In addition, the pouch-type secondary batteries in a standing form as above may be arranged in parallel in the left and right direction so that the wide surfaces thereof face each other.

If the pouch-type secondary batteries are arranged in the horizontal direction in a standing state as above, the heat pressure exchange member 300 may be disposed to stand up in the space between the secondary batteries 100. In particular, the heat pressure exchange member 300 may be configured in a plate shape. In this case, both wide surfaces of the heat pressure exchange member 300 may be positioned at left and right sides to face the wide surfaces of the accommodation portions 110 of the secondary batteries 100 disposed at the left and right sides of the heat pressure exchange member 300.

According to this configuration of the present disclosure, when the volume of the pouch-type secondary battery is expanded or contracted, the volume change may be reliably transmitted to the heat pressure exchange member 300. That is, in the pouch-type secondary battery, the accommodation portion 110 is often expanded in a horizontal outer direction (an x-axis direction in the drawing) during expansion, and the degree of expansion may also be greatest in the accommodation portion. Thus, if the heat pressure exchange member 300 having a plate shape is interposed between the pouch-type secondary batteries in a standing state, the volume change effect by the secondary battery 100 may be greatest when the secondary battery 100 is charged and discharged. Thus, the heat absorption and release effect by the heat pressure exchange member 300 may be further increased. Further, since the heat pressure exchange member 300 is formed in a plate shape, it is possible to prevent the volume of the battery module from unnecessarily increasing in a stacking direction (an x-axis direction in the drawing) of secondary batteries 100.

In addition, as shown in the figures, when the plurality of heat pressure exchange members 300 are interposed between the plurality of secondary batteries 100, the stacking direction of the pouch-type secondary batteries and the heat pressure exchange members 300 may be a horizontal direction. According to this configuration of the present disclosure, a pressure may be applied to the plurality of heat pressure exchange members 300 respectively as uniformly as possible. Thus, the heat may be absorbed and released by the heat pressure exchange members 300 as uniform as possible for the entire secondary batteries 100 in the battery module.

Meanwhile, when the plurality of secondary batteries 100 are stacked, the heat pressure exchange member 300 may be located at an outer side of the secondary battery 100 that is stacked at an outermost side. For example, referring to FIGS. 3 and 4, a heat pressure exchange member 300 may be stacked on a right side of the secondary battery 100 that stacked at a rightmost side. Also, a heat pressure exchange member 300 may be stacked on a left side of the secondary battery 100 that is stacked at a leftmost side. According to this configuration of the present disclosure, heat may be absorbed and released for the secondary battery 100 located at the outermost side in the stack of the secondary batteries 100 according to expansion, uniformly with other secondary batteries 100.

The heat pressure exchange members 300 may be made of the same material as a whole. For example, the heat pressure exchange member 300 may be entirely made of a ceramic material. In particular, the heat pressure exchange member 300 may be made of only trititanium-pentoxide ($Ti_3O_5$). However, the present disclosure is not necessarily limited to this embodiment, and the heat pressure exchange member 300 may be configured in various other forms.

Figure 5:
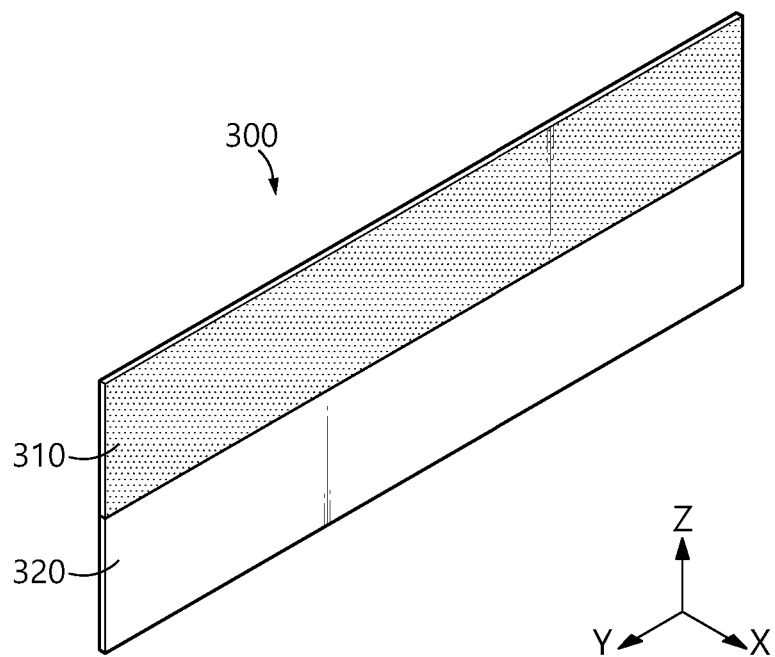
FIG. 5 is a perspective view schematically showing a heat pressure exchange member according to another embodiment of the present disclosure.

FIG. 5 is a perspective view schematically showing a heat pressure exchange member 300 according to another embodiment of the present disclosure. Also, FIG. 6 is a front sectioned view schematically showing a battery module including a plurality of heat pressure exchange members 300 of FIG. 5.

Figure 6:
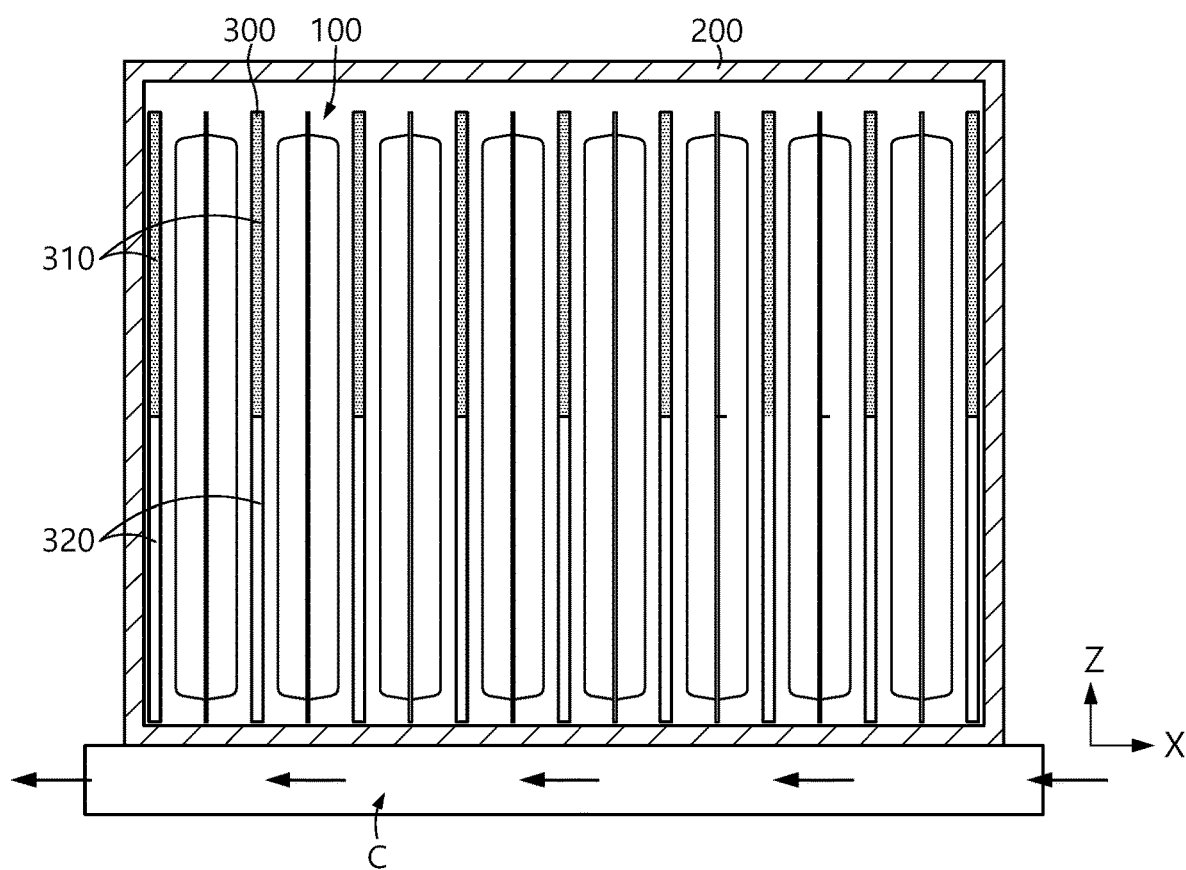
FIG. 6 is a front sectioned view schematically showing a battery module including a plurality of heat pressure exchange members of FIG. 5.

Referring to FIGS. 5 and 6, the heat pressure exchange member 300 may include a heat exchange unit 310 and a body unit 320.

The heat exchange unit 310 may be made of a material that absorbs and releases heat depending on whether a pressure is applied. That is, the heat exchange unit 310 may be made of a material that absorbs and retains heat from the surroundings (for example, the secondary battery 100) and releases the heat to the surroundings (the secondary battery 100) when it is pressed due to the expansion of the secondary battery 100 or the like. For example, the heat exchange unit 310 may be made of a heat storage ceramic material such as trititanium-pentoxide. Further, the heat exchange unit 310 may be provided at a position of the heat pressure exchange member 300 to which a volume change caused by charging and discharging of the secondary battery 100 is well transmitted.

The body unit 320 may be configured to support the heat exchange unit 310. In particular, the body unit 320 may be configured to complement the mechanical rigidity of the heat exchange unit 310 and allow the heat exchange unit 310 to be stably provided at an appropriate position inside the module case 200. In particular, the body unit 320 may be configured such that the heat exchange unit 310 is provided at a position where the volume of the secondary battery 100 is changed greatest.

The body unit 320 may be made of a material different from that of the heat exchange unit 310. In particular, unlike the heat exchange unit 310, the body unit 320 may be configured not to have a heat storage performance according to the volume change of the secondary battery 100. Meanwhile, the body unit 320 may be made of a material having excellent strength or hardness, or excellent formability. For example, the body unit 320 may be made of a metal or plastic material that is advantageous for securing mechanical rigidity.

Further, the body unit 320 may be made of a foam material. For example, the body unit 320 may be made of urethane foam material. The foam material may have elasticity. Thus, the foam material may be deformed to contract when a pressure is applied thereto and may easily return to its original shape when the applied pressure is released. Thus, according to this embodiment of the present disclosure, when the pressing force of the secondary battery 100 is transferred to the heat exchange unit 310 due to the expansion of the secondary battery 100, it is possible to prevent or reduce that the pressure transfer effect is blocked by the body unit 320.

In the configuration where the body unit 320 is included in the heat pressure exchange member 300 as described above, the body unit 320 may be configured in a standing plate shape. That is, the body unit 320 may be configured in a plate shape, without lying down, and may be configured such that two wide surfaces thereof are provided toward the horizontal direction, namely toward the left and right direction (the x-axis direction in the drawing), in a standing form.

In particular, this embodiment may be more useful for a cell assembly in which the pouch-type secondary batteries are stacked in a horizontal direction in a standing form. For example, as shown in FIG. 6, if the pouch-type secondary batteries are arranged in the left and right direction in a standing form, the body unit 320 having a plate shape may be disposed in the space between the pouch-type secondary batteries and/or at the outer side of the stack of the pouch-type secondary batteries in a standing form.

In this configuration, the heat exchange unit 310 may have a standing plate shape, and a lower end of the heat exchange unit 310 may be coupled in parallel to an upper end of the body unit 320. For example, the heat pressure exchange member 300 may include a body unit in a plate shape made of polyurethane and a heat exchange unit in a plate shape made of ceramic such as trititanium-pentoxide. At this time, a lower edge of the heat exchange unit in a plate shape may be coupled and fixed to an upper edge of the body unit in a plate shape. Further, the heat exchange unit 310 located at the upper portion and the body unit 320 located at the lower portion may be coupled in parallel to each other to form one plate such that their edges are in contact with each other in parallel.

According to this configuration of the present disclosure, inside the battery module, the space occupied by the configuration of exchanging heat with the secondary battery 100 (the heat exchange unit 310) and the configuration supporting the heat exchange configuration (the body unit 320) may not occupy much space. Thus, even if the heat pressure exchange configuration is introduced inside the battery module, it is possible to prevent the volume of the battery module from being greatly increased.

In addition, according to this configuration of the present disclosure, it may be advantageous to solve heat imbalance inside the battery module. For example, as shown in FIG. 6, a cooling configuration may be provided to a lower portion of the battery module, as indicated by C. Here, the cooling configuration may have a pipe form with a hollow, so that a cooling fluid such as air or water may flow in the inner hollow. Alternatively, the cooling configuration provided to the lower portion of the battery module may be configured to directly contact air or the like without a separate member such as a pipe. In particular, if the battery module is mounted to a vehicle, the battery module may be mounted to a lower portion of a vehicle body so that the lower portion of the battery module is naturally cooled by air or the like.

If the battery module is configured such that its lower portion is cooled, the temperature of the upper portion of the battery module may be relatively higher than the lower portion of the battery module adjacent to the cooling configuration. In this case, thermal imbalance may occur between several secondary batteries 100, and also thermal imbalance may occur between several portions of one secondary battery 100. That is, the temperature of an upper side of the secondary battery 100 may be relatively higher than a lower side thereof. In addition, the thermal imbalance may cause performance degradation of the secondary battery 100 or the battery module. In addition, if the temperature of a specific portion of the battery module is increased too high, a fire may occur.

However, according to the configuration of the present invention, it is possible to prevent the temperature of a specific portion in the battery module from being increased too high in a non-uniform state. For example, as shown in FIG. 6, due to the heat exchange member configured so that the heat exchange unit 310 is located at the upper portion of the battery module, the upper side of the battery module may be effectively cooled. That is, though the upper side of the battery module is located relatively far from the cooling configuration such as a cooling pipe, the heat may be additionally absorbed by the heat exchange member. Thus, the upper side having a high temperature in the secondary battery 100 may be additionally cooled.

Further, the heat exchange unit 310 according to an embodiment of the present disclosure may absorb the heat of the secondary battery 100 when the secondary battery 100 is discharged. Thus, if the battery module is mounted to a vehicle, the upper side of the secondary battery 100, which may be relatively weak in cooling performance, may have compensated cooling performance by the heat exchange unit 310 while the vehicle is running during which the secondary battery 100 is mainly discharged.

Figure 7:
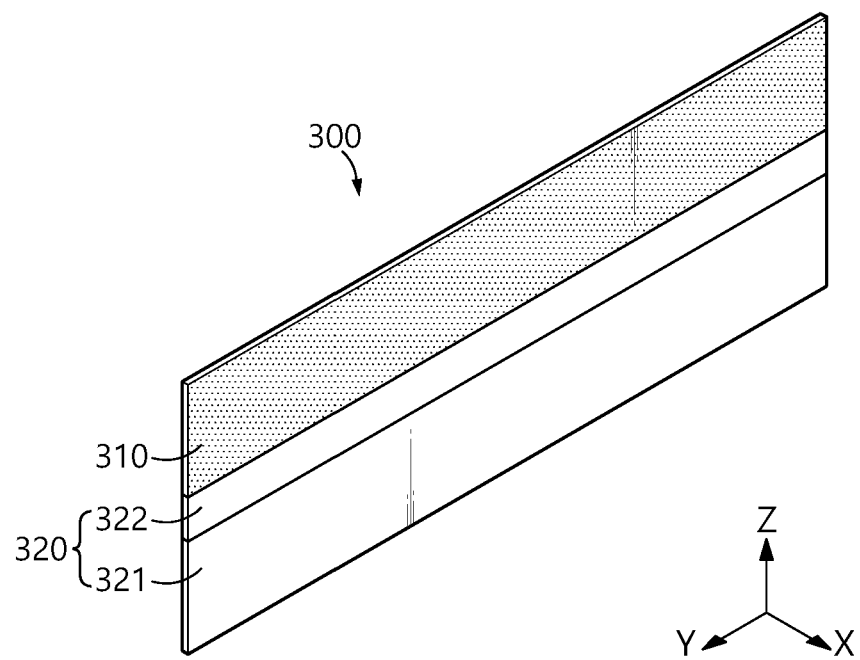
FIG. 7 is a perspective view schematically showing a heat pressure exchange member according to still another embodiment of the present disclosure.
Figure 8:
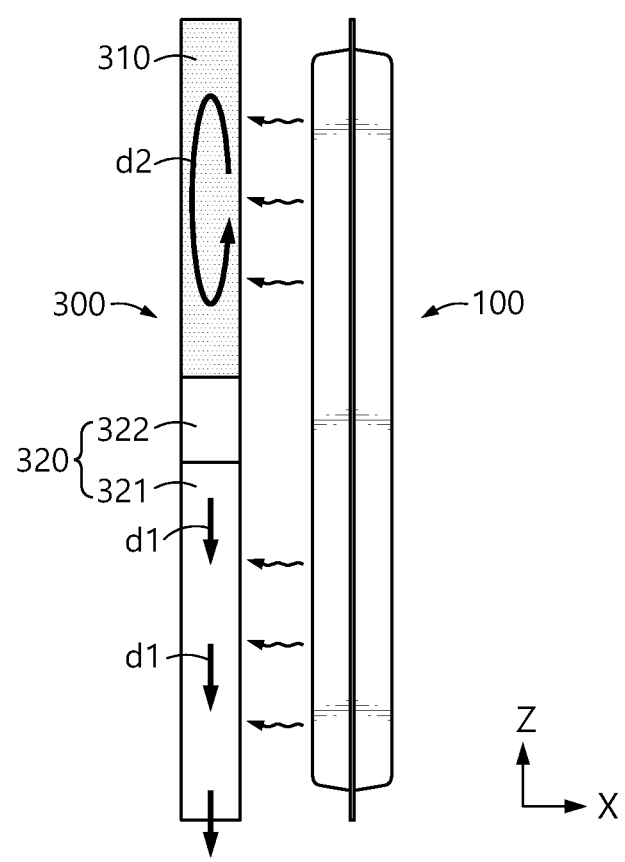
FIG. 8 is a diagram schematically showing the flow state of heat that may be formed at the heat pressure exchange member of FIG. 7 and the secondary battery, when the secondary battery is discharged.

FIG. 7 is a perspective view schematically showing a heat pressure exchange member 300 according to still another embodiment of the present disclosure. Also, FIG. 8 is a diagram schematically showing the flow state of heat that may be formed at the heat pressure exchange member 300 of FIG. 7 and the secondary battery 100, when the secondary battery 100 is discharged. For reference, in FIG. 8, only one secondary battery 100 and one heat pressure exchange member 300 are shown for convenience of description. Also, in FIG. 8, arrows generally exhibit a heat flow path. For this embodiment, features different from the former embodiments will be described in detail, and features that may be commonly applied to the former embodiments will not be described in detail.

First, referring to FIG. 7, the heat pressure exchange member 300 may include a heat exchange unit 310 and a body unit 320, and the body unit 320 of the heat pressure exchange member 300 may include a heat conduction part 321 and a heat blocking part 322.

Here, the heat conduction part 321 is made of a heat conductive material and may be configured to transfer heat by itself. For example, the heat conduction part 321 may be made of a metal material such as aluminum, copper or iron.

In addition, the heat blocking part 322 may be made of a material having substantially no thermal conductivity or a relatively low thermal conductivity than the heat conduction part 321. For example, the heat blocking part 322 may use a material having a thermal conductivity of 0.1 W/mK or less based on room temperature. In particular, the heat blocking part 322 may be made of a material having a thermal conductivity of 0.05 W/mK or less based on room temperature. As more specific examples, the heat blocking part 322 may be made of, or include, at least one of a polyethylene foam, an XPS (Extruded Polystyrene Sheet) foam, an EPS (Expanded Polystyrene) foam, a polyurethane foam, a hydrophilic soft foam and a urea foam.

In this configuration, the heat exchange unit 310 and the heat conduction part 321 may be spaced apart from each other by the heat blocking part 322. That is, the heat exchange unit 310 and the heat conduction part 321 may not be in direct contact with each other in the entire part but may be configured to contact only the heat blocking part 322, respectively. For example, referring to FIG. 7, the heat exchange unit 310, the heat blocking part 322 and the heat conduction part 321 may have a plate shape in the heat pressure exchange member 300, and the heat exchange unit 310, the heat blocking part 322 and the heat conduction part 321 may be configured to be located in order in one direction. In addition, the heat exchange unit 310, the heat blocking part 322 and the heat conduction part 321 may be configured to form one plate. For example, as shown in the figures, the heat exchange unit 310 may be located at an upper side, the body unit 320 may be located at a lower side, wherein the heat blocking part 322 may be located at an upper side in the body unit 320 and the heat conduction part 321 may be located at a lower side in the body unit 320. In this configuration, the heat exchange unit 310 and the heat conduction part 321 may be regarded as being spaced apart from each other without directly contacting at any portion.

According to this configuration of the present disclosure, heat exchange may not be performed between the heat exchange unit 310 and the heat conduction part 321. In particular, in this case, the heat absorbed by the heat exchange unit 310 may not be released to the outside through the heat conduction part 321. In this regard, referring to FIG. 8 in more detail, first, the heat at the lower side of the secondary battery 100 may be absorbed into the heat conduction part 321 of the heat pressure exchange member 300 adjacent thereto. In addition, the heat absorbed by the heat conduction part 321 in this way may be conducted downward inside the heat conduction part 321 and released to the outside (the lower portion) of the heat pressure exchange member 300, as indicated by the arrows d1 in FIG. 8. In this case, the heat absorbed by the heat conduction part 321 may not be transferred to the heat exchange unit 310 due to the heat blocking part 322.

Meanwhile, the heat at the upper side of the secondary battery 100 may be absorbed by the heat exchange unit 310 of the heat pressure exchange member 300 adjacent thereto. In addition, the heat absorbed by the heat exchange unit 310 may not be transferred to the heat conduction part 321 due to the heat blocking part 322 but may be retained in itself, as indicated by the arrow d2 in FIG. 8. However, even though it is shown in the drawings for convenience of description as if the heat circulates inside the heat exchange unit 310 as indicated by the arrow d2, this means that the heat is not transferred to a heat transfer part due to the heat blocking part 322 and does not necessarily mean that the heat is circulated.

In addition, the heat retained in the heat exchange unit 310 may be used to supply heat to the secondary battery 100, when a pressure is applied thereto, for example, when the secondary battery 100 is charged. That is, according to the configuration of the present disclosure, the heat absorbed from the secondary battery 100 to the heat exchange unit 310 may be retained in the heat exchange unit 310 without being released to the outside through the heat conduction part 321. Thus, by this configuration, the energy efficiency may be increased, and the performance of the heat pressure exchange member 300 may be more stably ensured. In particular, according to the configuration of the present disclosure, a portion of the heat pressure exchange member 300 may cause heat to be released to the cooling configuration outside the battery module, and another portion of the heat pressure exchange member 300 may retain heat in itself.

Meanwhile, in this specification, when the expressions such as "an upper side" and "a lower side" of a specific object, they may refer to an upper portion and a lower portion of the object when the specific object is divided in the upper and lower direction. Thus, unless otherwise specified, the upper side and the lower side of the specific object are only for distinguishing positions inside the specific object from each other and are not intended to distinguish positions outside the specific object. For example, the lower side of the secondary battery 100 does not mean a position below the secondary battery 100 but may mean a portion located in the lower portion of the secondary battery 100 when the secondary battery 100 itself is divided into upper and lower portions.

Figure 9:
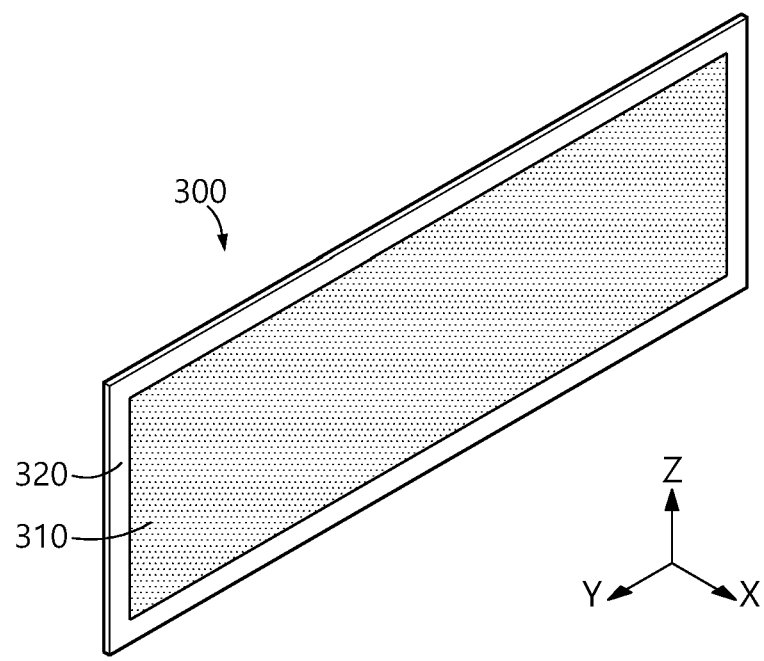
FIG. 9 is a perspective view schematically showing a heat pressure exchange member according to still another embodiment of the present disclosure.
Figure 10:
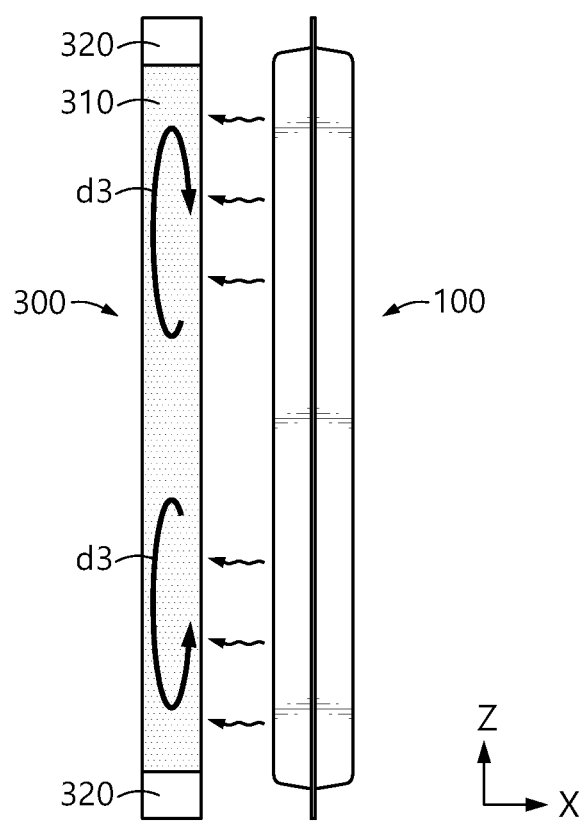
FIG. 10 is a diagram schematically showing the flow state of heat that may be formed at the heat pressure exchange member of FIG. 9 and the secondary battery, when the secondary battery is discharged.

FIG. 9 is a perspective view schematically showing a heat pressure exchange member 300 according to still another embodiment of the present disclosure. Also, FIG. 10 is a diagram schematically showing the flow state of heat that may be formed at the heat pressure exchange member 300 of FIG. 9 and the secondary battery 100, when the secondary battery 100 is discharged. In FIG. 10, only one secondary battery 100 and one heat pressure exchange member 300 are shown for convenience of description. In addition, this embodiment will be described in detail based on features different from the former embodiment.

First, referring to FIG. 9, the heat pressure exchange member 300 may include a heat exchange unit 310 and a body unit 320, and the body unit 320 may be positioned at an outer circumference of the heat exchange unit 310 to surround an edge of the heat exchange unit 310. For example, if the heat exchange unit 310 is configured in a rectangular plate shape, the body unit 320 may be formed in a rectangular ring shape to surround four edges of the heat exchange unit 310. In particular, in this configuration, the body unit 320 may cover the outer side of all edge portions of the heat exchange unit 310, except for both surfaces of the heat exchange unit 310, namely surfaces facing the secondary battery 100. In this case, the heat exchange unit 310 may directly face the secondary battery 100 through the center portion excluding the edge portions. That is, according to this configuration, the heat exchange unit 310 may face the accommodation portion of the secondary battery 100 at the center portion of the secondary battery 100, and the body unit 320 may face the edge sealing portion of the secondary battery 100 at the edge portions of the secondary battery 100.

In particular, in this configuration, the body unit 320 may be made of a material having a low thermal conductivity. For example, the body unit 320 may use a material having a thermal conductivity of 0.1 W/mK or less based on room temperature. In particular, the body unit 320 may be made of a material having a thermal conductivity of 0.05 W/mK or less based on room temperature. As more specific examples, the body unit 320 may be made of, or include, at least one of a polyethylene foam, an XPS (Extruded Polystyrene Sheet) foam, an EPS (Expanded Polystyrene) foam, a polyurethane foam, a hydrophilic soft foam and a urea foam.

According to this configuration of the present disclosure, since the heat exchange unit 310 and the secondary battery 100 directly face each other, the heat from the secondary battery 100 may be directly absorbed by the heat exchange unit 310 if no pressure is applied by the secondary battery 100. In addition, when the secondary battery 100 is expanded, the expanding force may be directly transmitted to the heat exchange unit 310. In addition, if the secondary battery 100 is expanded as above, the heat of the heat exchange unit 310 may be directly transferred to the secondary battery 100. For example, in FIG. 10, the heat may be transferred directly in the x-axis direction.

Meanwhile, the heat absorbed by the heat exchange unit 310 may be retained only inside the heat exchange unit 310 and may not be released to the outside of the heat pressure exchange member 300 by the body unit 320, particularly through the edge portion of the heat pressure exchange member 300. For example, referring to FIG. 10, when the secondary battery 100 is discharged, heat may be released from the secondary battery 100, and this heat may be absorbed into the heat exchange unit 310 and retained only therein without being easily transferred to the upper or lower side of the heat exchange unit 310 (an arrow d3). In addition, if a pressure is applied to release heat, the heat retained in the heat exchange unit 310 is mainly released in the left and right direction along which the secondary batteries 100 are located, namely in the stacking direction of the secondary batteries 100 (the x-axis direction in the drawing) without being easily released in a direction (the y-axis direction and the z-axis direction in the drawing) perpendicular to the stacking direction of the secondary batteries 100. In other words, since the body unit 320 made of a material having low thermal conductivity is present at the upper, lower, front and rear portions based on the heat exchange unit 310, the heat of the heat exchange unit 310 may mainly be discharged only in the left and right direction. Thus, according to this configuration of the present disclosure, the heat releasing performance of the heat exchange unit 310 to the secondary battery 100 is improved, thereby further improving the charging performance of the secondary battery 100 due to the temperature rise. Moreover, in this case, the heat retaining performance of the heat exchange unit 310 is improved, which also gives an excellent effect in terms of energy efficiency.

Meanwhile, even though the heat pressure exchange member 300 according to the various former embodiments has been described to include the heat exchange unit 310 having a plate shape, the present disclosure is not necessarily limited to these embodiments. In addition, the body unit 320 may also be configured in various shapes different from the former embodiments.

Figure 11:
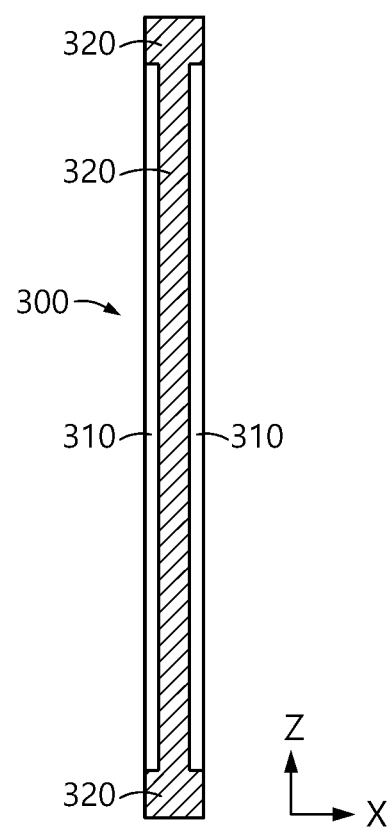
FIG. 11 is a front sectioned view schematically showing a heat pressure exchange member according to still another embodiment of the present disclosure.
Figure 12:
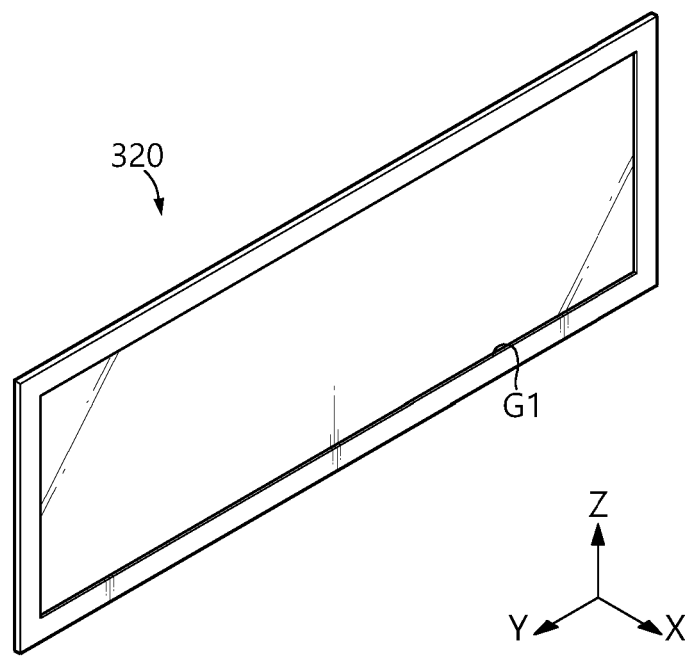
FIG. 12 is a perspective view schematically showing only a body unit of the heat pressure exchange member of FIG. 11.

FIG. 11 is a front sectioned view schematically showing a heat pressure exchange member 300 according to still another embodiment of the present disclosure, and FIG. 12 is a perspective view schematically showing only a body unit 320 of the heat pressure exchange member 300 of FIG. 11. Even in this embodiment, features different from the former embodiments will be described in detail.

Referring to FIGS. 11 and 12, the heat exchange unit 310 may be configured to be coated on at least a portion of the surface of the body unit 320. For example, the body unit 320 may be formed in a substantially plate shape to stand up between the secondary batteries 100 or at the outer side of the secondary batteries 100, and the heat exchange unit 310 may be coated on at least a portion of the surface of the body unit 320.

According to this configuration of the present disclosure, the mechanical strength of the heat pressure exchange member 300 may be stably secured. In particular, unlike the heat exchange unit 310 in which the performance of absorbing, retaining and releasing heat is important, the body unit 320 may employ a material having excellent mechanical rigidity as compared to the heat exchange unit 310. For example, the body unit 320 may be made of a material such as polymer or metal. Thus, according to the configuration, the body unit 320 having excellent mechanical rigidity may configure a basic skeleton of the heat pressure exchange member 300, and a material for exchanging heat according to pressure may be coated on the surface of the body unit 320, thereby securing the stable mechanical strength of the heat pressure exchange member 300.

In particular, the body unit 320 may have a concave groove formed in at least a portion thereof. In addition, the heat exchange unit 310 may be coated on the surface of the body unit 320 such that the heat exchange unit 310 is filled in the groove of the body unit 320. For example, the body unit 320 may have a concave groove dented in an inner horizontal direction at the center portion, as indicated by G1 in FIG. 12. In addition, the heat pressure exchange member 300 may be configured such that the heat exchange unit 310 is filled in the concave groove G1 of the body unit 320. According to this configuration of the present disclosure, the coating process of the heat exchange unit 310 may be easily performed, and the coupling force between the heat exchange unit 310 and the body unit 320 may be more stably secured. In addition, since the heat exchange unit 310 is blocked by the concave groove G1 in the front, rear, upper and lower directions, heat dissipation in these directions may be blocked, thereby more stably ensuring the heat retaining performance by the heat exchange unit 310.

Figure 13:
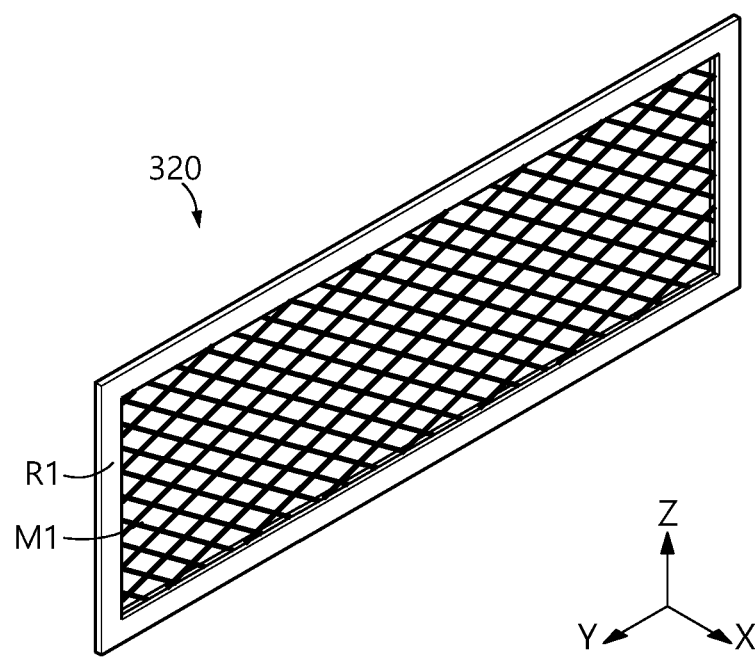
FIG. 13 is a perspective view schematically showing a body unit of a heat pressure exchange member according to another embodiment of the present disclosure.

FIG. 13 is a perspective view schematically showing a body unit 320 of a heat pressure exchange member 300 according to another embodiment of the present disclosure. The configuration of FIG. 13 may be a modified form of the body unit 320 shown in FIG. 12. In this embodiment, also, features different from the former embodiments will be described in detail.

Referring to FIG. 13, the body unit 320 of the heat pressure exchange member 300 may be formed in a substantially ring shape, and a center portion of the ring may be formed in a mesh shape. For example, the body unit 320 may include an edge part R1 formed in a rectangular ring shape and a mesh part M1 formed in a net shape in a central empty space of the edge part R1. In the body unit 320, the heat exchange unit 310 may be configured to be filled in the mesh part M1.

According to this configuration of the present disclosure, the mechanical stiffness of the edge part R1 may be complemented by the mesh part M1. In addition, according to this configuration of the present disclosure, the coupling force between the heat exchange unit 310 and the body unit 320 may be improved by the mesh part M1. In particular, if the heat exchange unit 310 is made of a ceramic material, the ceramic material may be well bonded to the mesh part M1 of the body unit 320 during the manufacturing process. Moreover, according to this configuration of the present disclosure, the heat exchange unit 310 may be completely filled in the horizontal direction due to the penetrated portions of the mesh part M1 in the left and right horizontal direction (the x-axis direction in the drawing). Thus, it may be more advantageous for the heat exchange unit 310 to absorb, retain and release heat.

Figure 14:
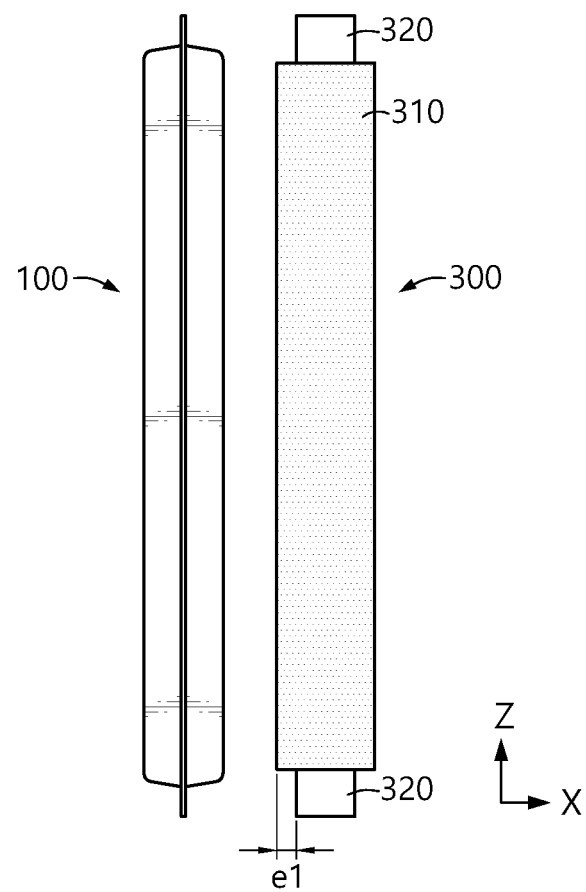
FIG. 14 is a front sectioned view schematically showing a heat pressure exchange member and a secondary battery according to still another embodiment of the present disclosure.

FIG. 14 is a front sectioned view schematically showing a heat pressure exchange member 300 and a secondary battery 100 according to still another embodiment of the present disclosure. Hereinafter, also, features different from the former embodiments will be described in detail.

Referring to FIG. 14, in the heat pressure exchange member 300, the heat exchange unit 310 may be configured to protrude toward the secondary battery 100 further to the body unit 320. That is, based on a left portion of the heat pressure exchange member 300 in the figure, the heat exchange unit 310 may be configured to protrude as much as indicated by e1 toward the secondary battery 100, namely in a left direction, compared to the body unit 320. Thus, the heat exchange unit 310 may be configured closer to the secondary battery 100 than the body unit 320. In addition, the secondary battery 100 may also be located at a right side of the heat pressure exchange member 300. For this purpose, the heat exchange unit 310 may also be configured to protrude further to the body unit 320 in the right direction.

According to this configuration of the present disclosure, the performance of absorbing, retaining and/or releasing heat by the heat exchange unit 310 may be improved. For example, when the secondary battery 100 absorbs heat, since the heat exchange unit 310 is configured closer to the secondary battery 100 than the body unit 320, the heat of the secondary battery 100 may be transferred to the heat exchange unit 310 better compared to the body unit 320. In addition, since the material of the heat exchange unit 310 is provided in a sufficient amount at the heat pressure exchange member 300, the heat retaining performance by the heat exchange unit 310 may be secured to a certain level or more. Moreover, according to this configuration, since the heat exchange unit 310 protrudes toward the secondary battery 100 further to the body unit 320, the expanding force of the secondary battery 100 may be easily transferred to the body unit 320 without being interfered by the body unit 320 when the secondary battery 100 is expanded. Thus, the heat releasing performance of the heat exchange unit 310 by pressing may be securely provided. In addition, since the heat exchange unit 310 is located closer to the secondary battery 100, when heat is released, the heat may be more easily transferred to the secondary battery 100.

Figure 15:
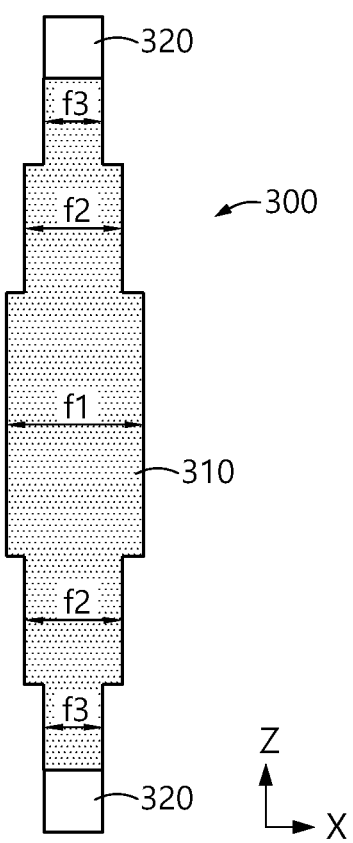
FIGS. 15 and 16 are front sectioned views schematically showing a heat pressure exchange member according to still another embodiment of the present disclosure.
Figure 16:
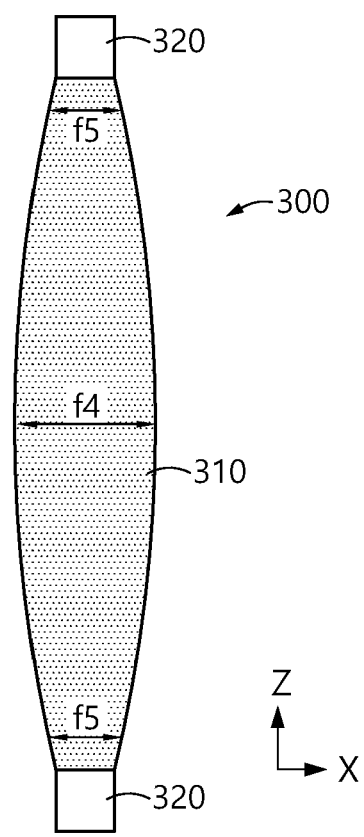

FIGS. 15 and 16 are front sectioned views schematically showing a heat pressure exchange member 300 according to still another embodiment of the present disclosure. Hereinafter, also, features different from the former embodiments will be described in detail.

As shown in FIGS. 15 and 16, in one heat pressure exchange member 300, the heat exchange unit 310 may be configured to have portions with different thicknesses. Here, the thickness of the heat exchange unit 310 may be referred to as a length or width of the heat exchange unit 310 in the stacking direction of the secondary batteries 100.

For example, referring to FIG. 15, the heat exchange unit 310 may be configured to have a step formed in one direction on a plane (a y-z plane) perpendicular to the stacking direction (the x-axis direction) of the secondary batteries 100, for example in the upper and lower direction (the z-axis direction). That is, the heat exchange unit 310 may have a plurality of stages so that the thickness in the left and right direction is partially changed from the upper portion to the lower portion. In particular, in FIG. 15, the heat exchange unit 310 may have stages respectively having thicknesses f1, f2 and f3. At this time, the values of f1, f2 and f3 may be different from each other.

In another example, referring to FIG. 16, the heat exchange unit 310 may have an inclined portion whose thickness is gradually changed in the upper and lower direction. That is, due to the inclined configuration, the heat exchange unit 310 may have different thicknesses in the upper and lower direction as indicated by f4 and f5 in the figure.

According to this configuration of the present disclosure, the performance of absorbing, retaining and/or releasing heat by the heat exchange unit 310 may be more effectively achieved. Thus, if a portion that requires more cooling or heating for one secondary battery 100 is present, heat may be absorbed and/or released more intensively for the portion by means of the heat pressure exchange member 300.

In particular, the heat exchange unit 310 may be configured such that at least a portion thereof becomes thinner from the center portion of the secondary battery 100 to the edge portion thereof.

For example, as shown in FIG. 15, in the heat exchange unit 310, assuming that a thickness of a portion (a stage) positioned at the center portion in the upper and lower directions is f1 and thicknesses of stages located at outer sides from the center portion are f2 and f3 in order, the following relationship f1>f2>f3 may be established.

Also, referring to FIG. 16, assuming that the thickness of the portion located in the center portion of the heat exchange unit 310 in the upper and lower direction is f4 and the thickness of the ends of the heat exchange unit 310 in the upper and lower direction (the outer direction) is f5, the following relationship f4>f5 may be established.

According to this configuration of the present disclosure, the performance of absorbing, retaining and/or releasing heat of the secondary battery 100 may be further improved. In particular, in the case of a pouch-type secondary battery, the volume change of the center portion may be more severe than the edge portion. In addition, when a plurality of pouch-type secondary batteries are accommodated in the battery module, a lot of heat is often discharged from the center portion of each secondary battery 100. Moreover, when the secondary battery 100 is charged, if a chemical reaction is actively performed at a portion where the accommodation portion is located, the charging performance may be further improved. Thus, according to this configuration, when the pouch-type secondary battery is expanded, the expanding force may be easily transferred to the heat exchange unit 310, thereby improving the heat releasing performance of the heat exchange unit 310. In addition, the heat generated from the secondary battery 100 may be easily transferred to the heat exchange unit 310, and conversely, the heat of the heat exchange unit 310 may be easily transferred to the secondary battery 100.

Meanwhile, in the battery module according to the present disclosure, at least a portion of the heat pressure exchange member 300 may be fixedly coupled to the module case 200.

For example, the upper and lower ends of the heat pressure exchange member 300 may be fixedly coupled to the inner surface of the module case 200. More specifically, protrusions in a stopper form may be formed on the upper and lower surfaces of the inner space of the module case 200 to block movement in the left and right direction with respect to the upper and lower ends of the heat pressure exchange member 300. As another example, insert grooves may be formed at the upper and lower surfaces of the inner space of the module case 200 so that the upper and lower ends of the heat pressure exchange member 300 are inserted and fastened thereto.

According to this configuration of the present disclosure, the position of the heat pressure exchange member 300 may be stably fixed inside the module case 200. In addition, when the secondary battery 100 is expanded, the pressing force caused by the expansion may be smoothly transferred to the heat pressure exchange member 300. Thus, the heat releasing according to the pressure by the heat pressure exchange member 300 may be more reliably performed. Moreover, even when the secondary battery 100 contracts, the position of the heat pressure exchange member 300 may be maintained at its original position.

Figure 17:
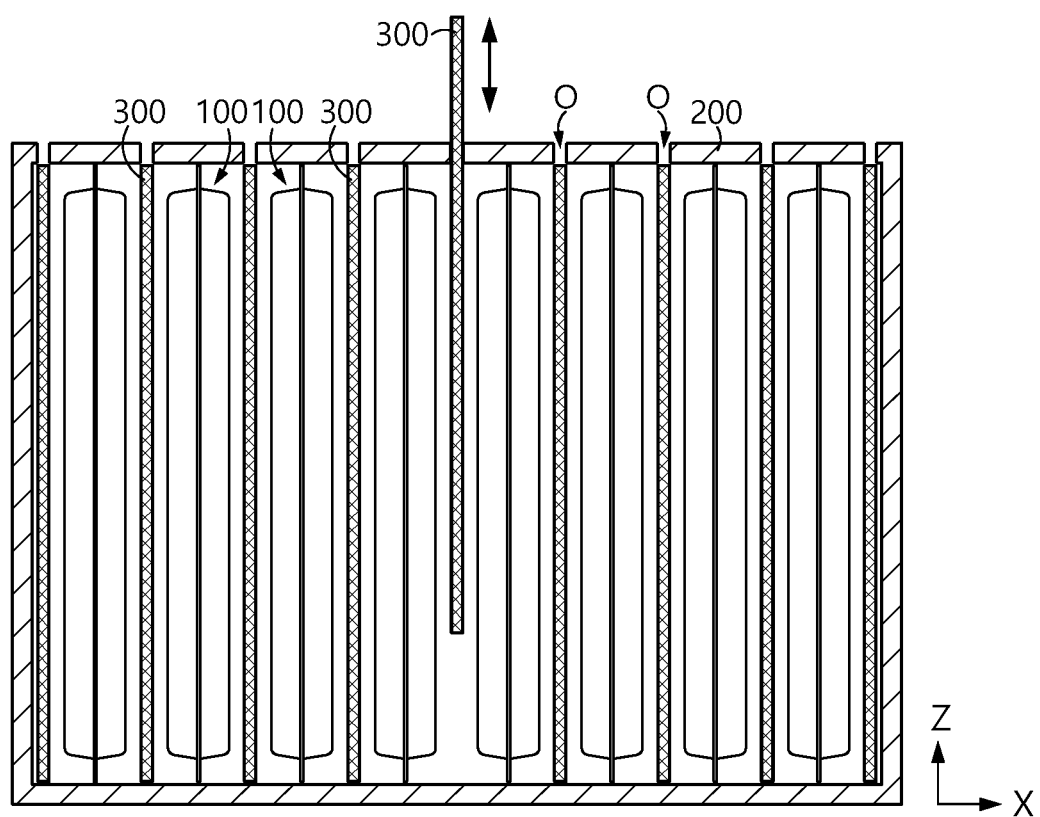
FIG. 17 is a front sectioned view schematically showing a battery module according to still another embodiment of the present disclosure.

FIG. 17 is a front sectioned view schematically showing a battery module according to still another embodiment of the present disclosure. Here, also, features different from the former embodiments will be described in detail.

Referring to FIG. 17, the heat pressure exchange member 300 may be configured to be replaceable with respect to the module case 200. More specifically, as shown in the figure, the heat pressure exchange member 300 may be configured to be drawn in or out in the upper direction of the module case 200. To this end, the module case 200 may have a port O formed in at least on one side, for example an upper side, for drawing the heat pressure exchange member 300 in or out.

According to this configuration of the present disclosure, if the performance of the heat pressure exchange member 300 is degraded, the heat pressure exchange member 300 may be replaced with a new heat pressure exchange member 300, so that the heat control performance by the heat pressure exchange member 300 may be stably maintained for a long time. In addition, in some cases, it may be necessary to change the performance of the heat pressure exchange member 300. In this case, the heat pressure exchange member 300 may be replaced with a heat pressure exchange member 300 having a different amount of heat-retaining material such as a heat storage ceramic material. For example, if a battery module already manufactured is used in a polar region with a low temperature, the heat pressure exchange member 300 of the battery module may be replaced with a heat pressure exchange member 300 with higher heat absorbing, retaining and releasing performance. Alternatively, since the temperature distribution inside the battery module may vary depending on a location where the battery module is mounted, the heat pressure exchange member 300 may be replaced with another heat pressure exchange member 300 in which the heat exchange unit 310 is located differently. Thus, according to this embodiment, it is possible to provide a battery module that may be more adaptive to the surrounding situations or environments to optimize the performance of the heat pressure exchange member 300.

In addition, in the battery module according to the present disclosure, the secondary battery 100 is a lithium secondary battery 100, and the negative electrode plate therein may include a silicon-based material. That is, the secondary battery 100 included in the battery module according to the present disclosure may use a silicon-based material as a negative electrode active material. If the silicon-based material is used as the negative electrode active material, the capacity may be greatly increased compared to the case where a carbon-based material is used. Further, in the case of the secondary battery 100 to which the silicon-based material is applied, a volume expansion ratio is very large. Thus, the effect of the present disclosure for releasing and absorbing heat by expansion and contraction of the secondary battery 100 during charging and discharging may be further increased.

Here, the silicon-based material may be, for example, silicon, alloys of silicon, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0.5 \leq v \leq 1.2$), $LiSiO$, $SiO$, or the like, but the present disclosure is not limited by a specific kind of silicon-based material. In addition, the secondary battery 100 to which the silicon-based material is applied as the negative electrode active material is already known at the time of filing of this application and thus will not be described in detail here. Moreover, the battery module of the present disclosure may include the secondary battery 100 to which various silicon-based materials known at the time of filing of this application are employed as a negative electrode active material.

Meanwhile, although not shown in various drawings described above, the battery module according to the present disclosure may further include other components in addition to the secondary battery 100, the module case 200 and the heat pressure exchange member 300.

For example, the battery module according to the present disclosure may further include a stacking frame. The stacking frame is provided to facilitate stacking of the pouch-type secondary batteries, and a plurality of stacking frames may be configured to be stacked on each other. Also, the pouch-type secondary battery may be accommodated in an inner space formed by stacking the plurality of stacking frames. The stacking frame may be formed in a substantially rectangular ring shape and may further include a component such as a cooling plate at a center portion thereof. The stacking frame may also be referred to as a cartridge. The stacking frame is already known at the time of filing of this application and thus will not be described in detail here.

A battery pack according to the present disclosure may include at least one battery module of the present disclosure. In addition, the battery pack according to the present disclosure may further include a pack case for accommodating the battery module and various devices for controlling charge/discharge of the battery module such as a battery management system (BMS), a current sensor and a fuse, in addition to the battery module.

The battery module according to the present disclosure may be applied to vehicles such as electric vehicles and hybrid electric vehicles. That is, a vehicle according to the present disclosure may include the battery module of the present disclosure. In particular, in the case of a vehicle that obtains a driving power from a battery, like an electric vehicle, the cooling performance and/or the charging performance of the battery module is very important. Thus, if the battery module according to the present disclosure is applied to the vehicle, the battery module may ensure stability and safety with effective cooling performance and/or the charging performance and also have excellent charging performance, in particular excellent rapid charging performance.

In this specification, terms indicating directions such as "up", "down", "left", "right", "front" and "rear" used, but these terms are merely for convenience of description and may vary depending on the location of an object or the location of an observer, as apparent to those skilled in the art.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: secondary battery
200: module case
201: body,
202: cover
300: heat pressure exchange member
310: heat exchange unit,
320: body unit
321: heat conduction part,
322: heat blocking part

What is claimed is:
1. A battery module, comprising:
at least one secondary battery;
a module case having an inner space formed therein to accommodate the at least one secondary battery in the inner space; and
at least one heat pressure exchange member disposed to face the at least one secondary battery in the inner space of the module case, the at least one heat pressure exchange member made of a solid material having a constant thickness which absorbs and retains heat when a pressure applied from the secondary battery is equal to or less than a reference value and releases the retained heat when the pressure applied from the secondary battery is higher than the reference value,
wherein the at least one heat pressure exchange member includes a first material, a second material, the second material absorbing and retaining heat depending on whether a pressure is applied and a third material between the first material and the second material in a height direction of the at least one heat pressure exchange member,
wherein a lower edge of the third material is joined to an upper edge of the first material and an upper edge of the third material is joined to a lower edge of the second material, and
wherein the third material has a lower thermal conductivity than the first material.

2. The battery module according to claim 1, wherein a top edge of the first material forms a top edge of the at least one heat pressure exchange member, and
    wherein a bottom edge of the second material forms a bottom edge of the at least one heat pressure exchange member.

3. A battery pack, comprising the battery module according to claim 1.

4. A vehicle, comprising the battery module according to claim 1.

* * * * *